United States Patent
Yu et al.

(10) Patent No.: US 8,768,090 B2
(45) Date of Patent: Jul. 1, 2014

(54) IMAGE ADJUSTMENT METHOD AND DEVICE

(75) Inventors: Chia-Wei Yu, Taipei (TW); Chun-Hsing Hsieh, Hsinchu (TW)

(73) Assignee: Realtek Semiconductor Corp. (TW)

( * ) Notice: Subject to any disclaimer, the term of this patent is extended or adjusted under 35 U.S.C. 154(b) by 240 days.

(21) Appl. No.: 13/240,467

(22) Filed: Sep. 22, 2011

(65) Prior Publication Data
US 2012/0082379 A1      Apr. 5, 2012

(30) Foreign Application Priority Data
Sep. 30, 2010   (TW) .............................. 99133283 A (51) Int. Cl.
G06K 9/00   (2006.01)
G06K 9/38   (2006.01)

(52) U.S. Cl.
USPC ......................................... 382/270; 382/162

(58) Field of Classification Search
USPC .................. 382/162, 167, 254, 260–266, 274
See application file for complete search history.

(56) References Cited

U.S. PATENT DOCUMENTS

| | | | |
|---|---|---|---|
| 4,959,711 A * | 9/1990 | Hung et al. .................... | 358/523 |
| 5,845,017 A * | 12/1998 | Keyes ............................ | 382/261 |
| 6,856,704 B1 * | 2/2005 | Gallagher et al. ............ | 382/263 |
| 7,388,621 B2 | 6/2008 | Hsu | |
| 7,643,696 B2 * | 1/2010 | Kita .............................. | 382/260 |
| 7,657,113 B2 * | 2/2010 | Wong et al. ................... | 382/260 |
| 7,751,619 B2 * | 7/2010 | Kawanishi et al. ........... | 382/167 |
| 7,995,839 B2 * | 8/2011 | Tanaka et al. ................. | 382/167 |
| 2004/0081363 A1 * | 4/2004 | Gindele et al. ................ | 382/260 |
| 2005/0111751 A1 * | 5/2005 | Avinash ........................ | 382/275 |
| 2006/0039624 A1 * | 2/2006 | Kong et al. ................... | 382/274 |
| 2006/0203914 A1 * | 9/2006 | Tsai et al. ................ | 375/240.16 |
| 2006/0262206 A1 | 11/2006 | Lee et al. | |
| 2007/0242875 A1 * | 10/2007 | Tanaka et al. ................. | 382/162 |
| 2010/0195901 A1 * | 8/2010 | Andrus et al. ................ | 382/162 |

FOREIGN PATENT DOCUMENTS

| | | |
|---|---|---|
| CN | 101079959 A | 11/2007 |
| EP | 1816601 A1 | 8/2007 |

OTHER PUBLICATIONS

State Intellectual Property Office of the P.R.C., Search Report dated Apr. 8, 2013 for Chinese Application No. 201010508708X and provided in Office action dated Apr. 25, 2013, 4 pages.

* cited by examiner

*Primary Examiner* — Andrae S Allison
(74) *Attorney, Agent, or Firm* — Sunstein Kann Murphy & Timbers LLP (57) ABSTRACT

An image adjustment method includes the steps of: a) configuring a weight-value generator to receive first image data and specified data and to generate an adaptive weight value according to the first image data and the specified data; and b) configuring an image blender to receive the first image data and second image data, and to generate adjusted image data by blending the first image data and the second image data with reference to the adaptive weight value. The adaptive weight value has a magnitude that corresponds to a difference between the first image data and the specified data.

20 Claims, 7 Drawing Sheets

IMAGE ADJUSTMENT METHOD AND DEVICE

CROSS-REFERENCE TO RELATED APPLICATION

This application claims priority of Taiwanese Application No. 099133283, filed on Sep. 30, 2010.

BACKGROUND OF THE INVENTION

1. Field of the Invention

The present invention relates to an image enhancement technique, more particularly to an image adjustment method and an image adjustment device for adjusting an image based upon specified data.

2. Description of the Related Art

Conventional image enhancement techniques generally include noise reduction, edge sharpening, color adjustment, etc. However, all pixels of an image that is subjected to such conventional image enhancement techniques generally undergo an equal level of adjustment. Differences among the pixels as perceived by a user are thus ignored.

SUMMARY OF THE INVENTION

Therefore, an object of the present invention is to provide an image adjustment method capable of alleviating the aforesaid drawback of the prior art.

Accordingly, an image adjustment method of the present invention includes the steps of:

a) configuring a weight-value generator to receive first image data and specified data and to generate an adaptive weight value according to the first image data and the specified data; and b) configuring an image blender to receive the first image data and second image data, and to generate adjusted image data by blending the first image data and the second image data with reference to the adaptive weight value;

wherein the adaptive weight value has a magnitude that corresponds to a difference between the first image data and the specified data.

Another object of the present invention is to provide an image adjustment device capable of alleviating the aforesaid drawback of the prior art.

Accordingly, an image adjustment device of the present invention includes:

a weight-value generator adapted for receiving first image data and specified data and configured to generate an adaptive weight value according to the first image data and the specified data; and an image blender adapted for receiving the first image data and second image data, and configured to generate adjusted image data by blending the first image data and the second image data with reference to the adaptive weight value;

wherein the adaptive weight value has a magnitude that corresponds to a difference between the first image data and the specified data.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
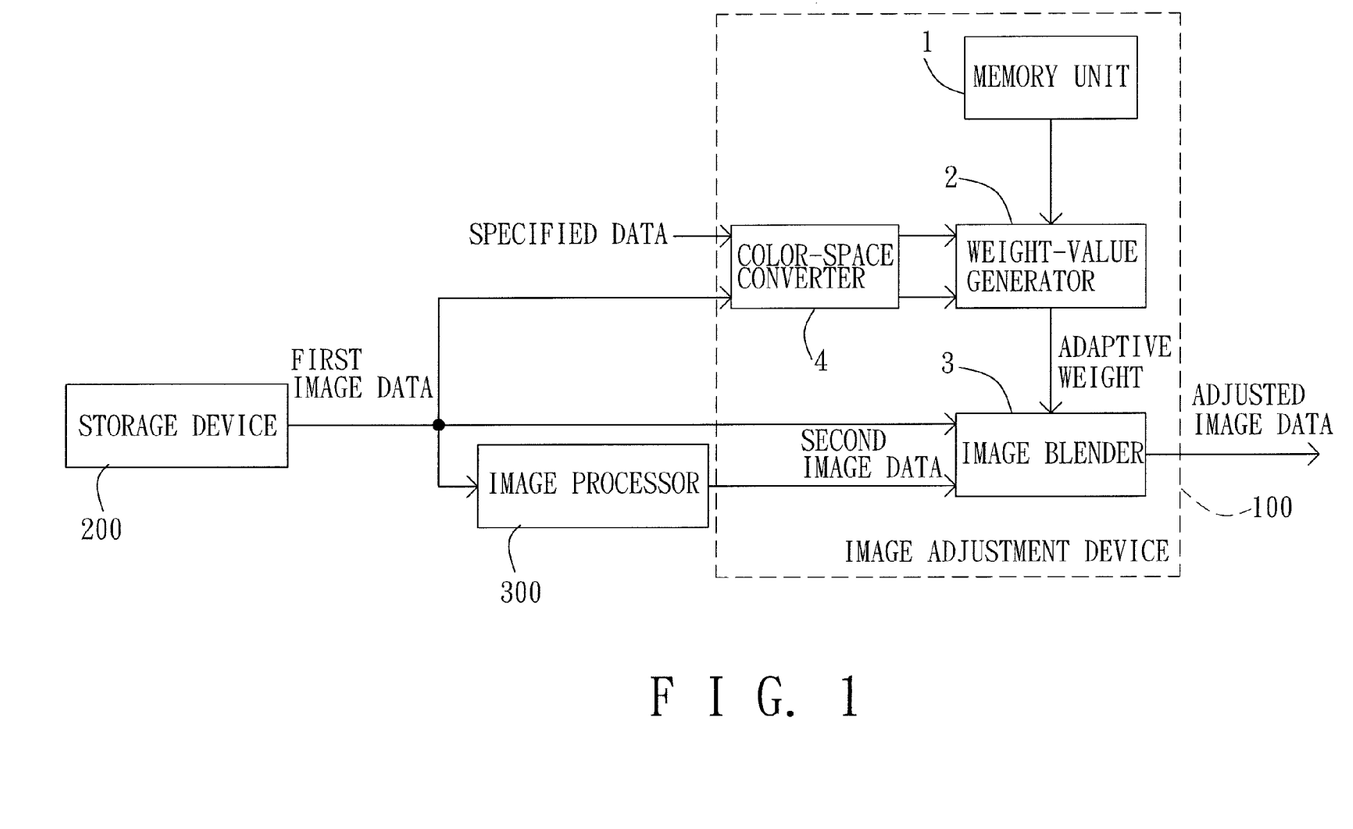
FIG. 1 is a schematic block diagram of the first preferred embodiment of an image adjustment device, a storage device, and an image processor, according to the present invention.

Referring to FIG. 1, the first preferred embodiment of an image adjustment device 100 according to the present invention is operable for blending first image data and second image data so as to generate adjusted image data.

In this embodiment, the first image data is stored in a storage device 200, and the second image data is generated by subjecting the first image data to a predetermined image-processing process (e.g., a noise reduction process, a contrast adjustment process, a sharpness adjustment process, or a saturation adjustment process) by an image processor 300.

The image adjustment device 100 includes a memory unit 1, a weight-value generator 2, and an image blender 3. The memory unit 1 has a look-up table stored therein. The weight-value generator 2 is adapted to receive the first image data and specified data, and is configured to generate an adaptive weight value according to the first image data and the specified data. The image blender 3 is adapted to receive the first image data and the second image data, and is configured to generate the adjusted image data by blending the first image data and the second image data with reference to the adaptive weight value.

The first image data includes a first pixel, and the specified data includes a first specified pixel, which may be a color pixel. In the present embodiment, blending of the first and second image data with reference to the adaptive weight value is independently performed upon corresponding pixels of the first and second image data.

Figure 2:
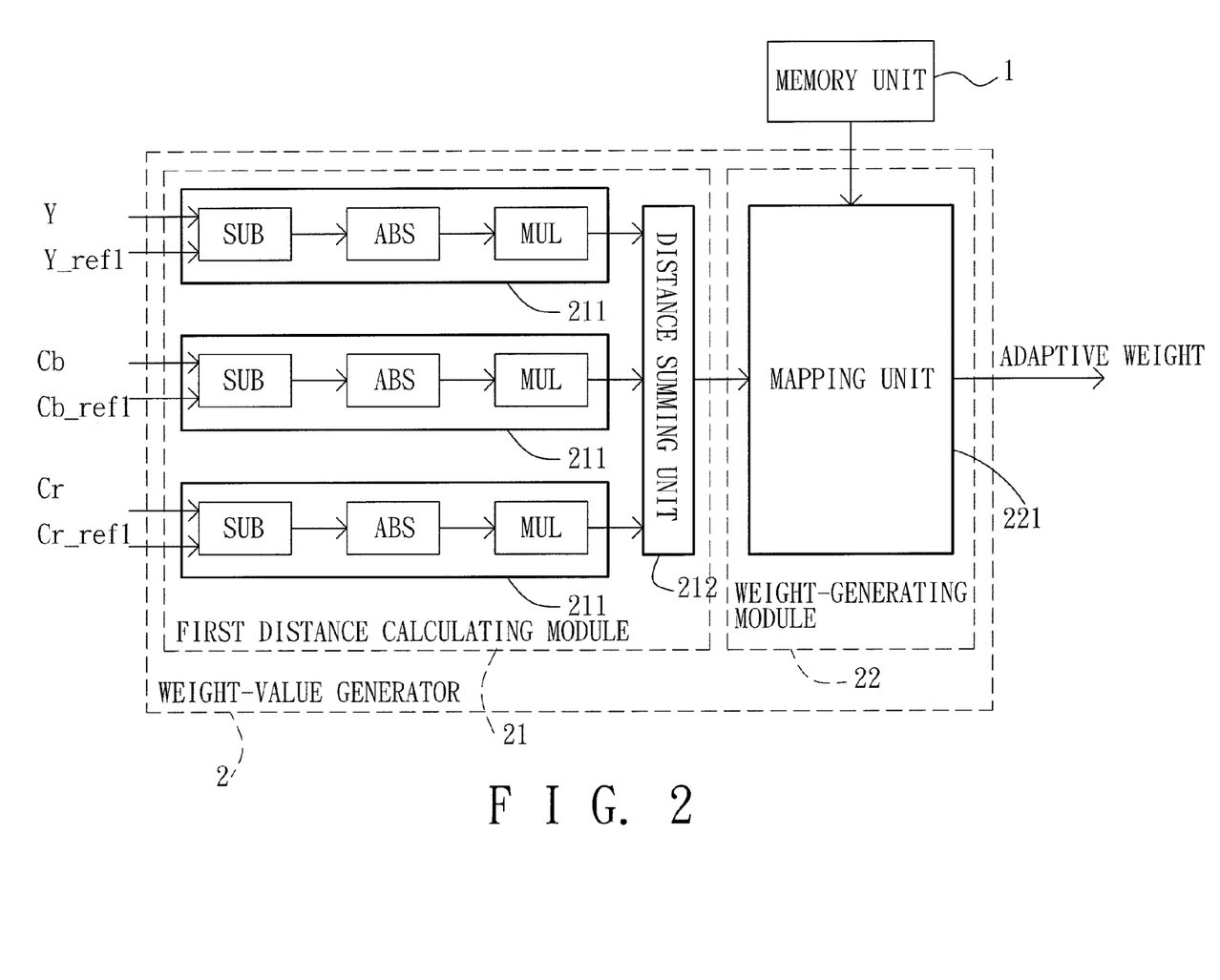
FIG. 2 is a schematic block diagram of a weight-value generator of the image adjustment device.

Referring to FIG. 2, the weight-value generator 2 includes a first distance calculating module 21 and a weight-generating module 22. The first distance calculating module 21 is configured to generate a first weight distance corresponding to a difference between the first pixel and the first specified pixel. Subsequently, the weight-generating module 22 is configured to obtain a first mapping value based on a result of matching between the first weight distance and the look-up table in the memory unit 1, and to generate the adaptive weight value based on the first mapping value.

In the present embodiment, each pixel of the first image data is presented in a color space of YCbCr, and hence includes three pixel components (Y, Cb, Cr). The first specified pixel includes a plurality of components (Y_ref1, Cb_ref1, Cr_ref1) that correspond to the pixel components (Y, Cb, Cr) of the first pixel, respectively. It is to be noted that, in other embodiments, the first image data may be presented in other color spaces, such as RGB, and each pixel thereof may include any number of pixel components.

Figure 3:
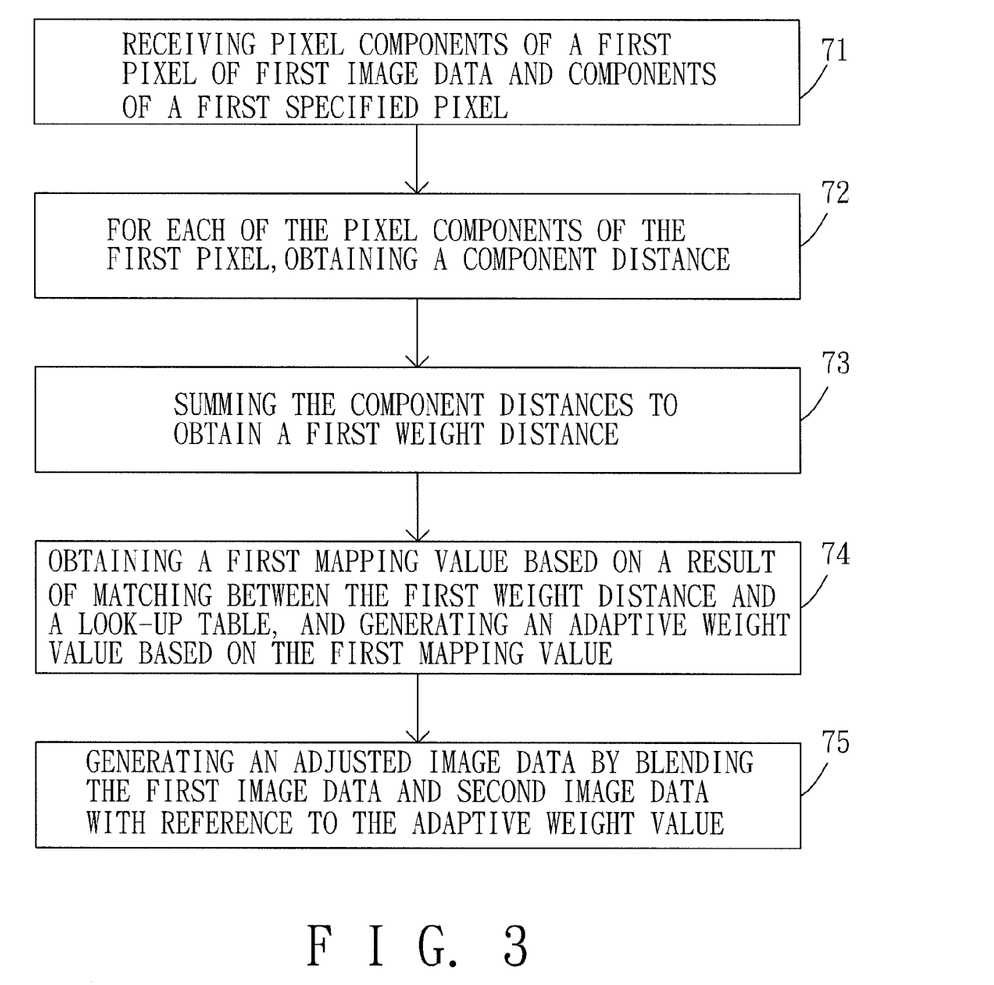
FIG. 3 is a flowchart to illustrate the first preferred embodiment of an image adjustment method according to the present invention.

The first distance calculating module 21 includes three distance calculating units 211 and a distance summing unit 212. Referring to FIG. 3, the image adjustment device 100 is configured to perform the first preferred embodiment of an image adjustment method according to the present invention.

In step 71, each of the distance calculating units 211 is configured to receive a respective one of the pixel components (Y, Cb, Cr) of the first pixel and a respective one of the components (Y_ref1, Cb_ref1, Cr_ref1) of the first specified pixel.

In step 72, each of the distance calculating units 211 includes: a subtractor (SUB) configured for obtaining a difference between the respective one of the pixel components (Y, Cb, Cr) of the first pixel and the respective one of the components (Y_ref1, Cb_ref1, Cr_ref1) of the first specified pixel; an absolute-value circuit (ABS) configured for performing an absolute-value operation upon the difference obtained by the subtractor (SUB) so as to obtain an absolute-value difference; and a multiplier (MUL) configured for performing a multiplication of preferably 0, 1, 2, or 4 upon the absolute-value difference so as to obtain a component distance.

It is to be noted that the multiplication performed upon the absolute-value difference by the multiplier (MUL) may be configured based upon perception of each of the pixel components by the human eyes. For example, in comparison with saturation, human eyes are more sensitive to brightness. Therefore, the multiplier (MUL) of the distance calculating unit 211 that corresponds to the brightness component (i.e., the Y component) may be configured to perform a higher multiplication upon the respective absolute-value difference.

In step 73, the distance summing unit 212 is configured to sum the component distances obtained for the first pixel so as to obtain the first weight distance.

In step 74, the weight-generating module 22 includes a mapping unit 221 configured to obtain the first mapping value based on a result of matching between the first weight distance and the look-up table in the memory unit 1, and to generate the adaptive weight value based on the first mapping value. In this embodiment, the first mapping value serves as the adaptive weight value.

Figure 4:
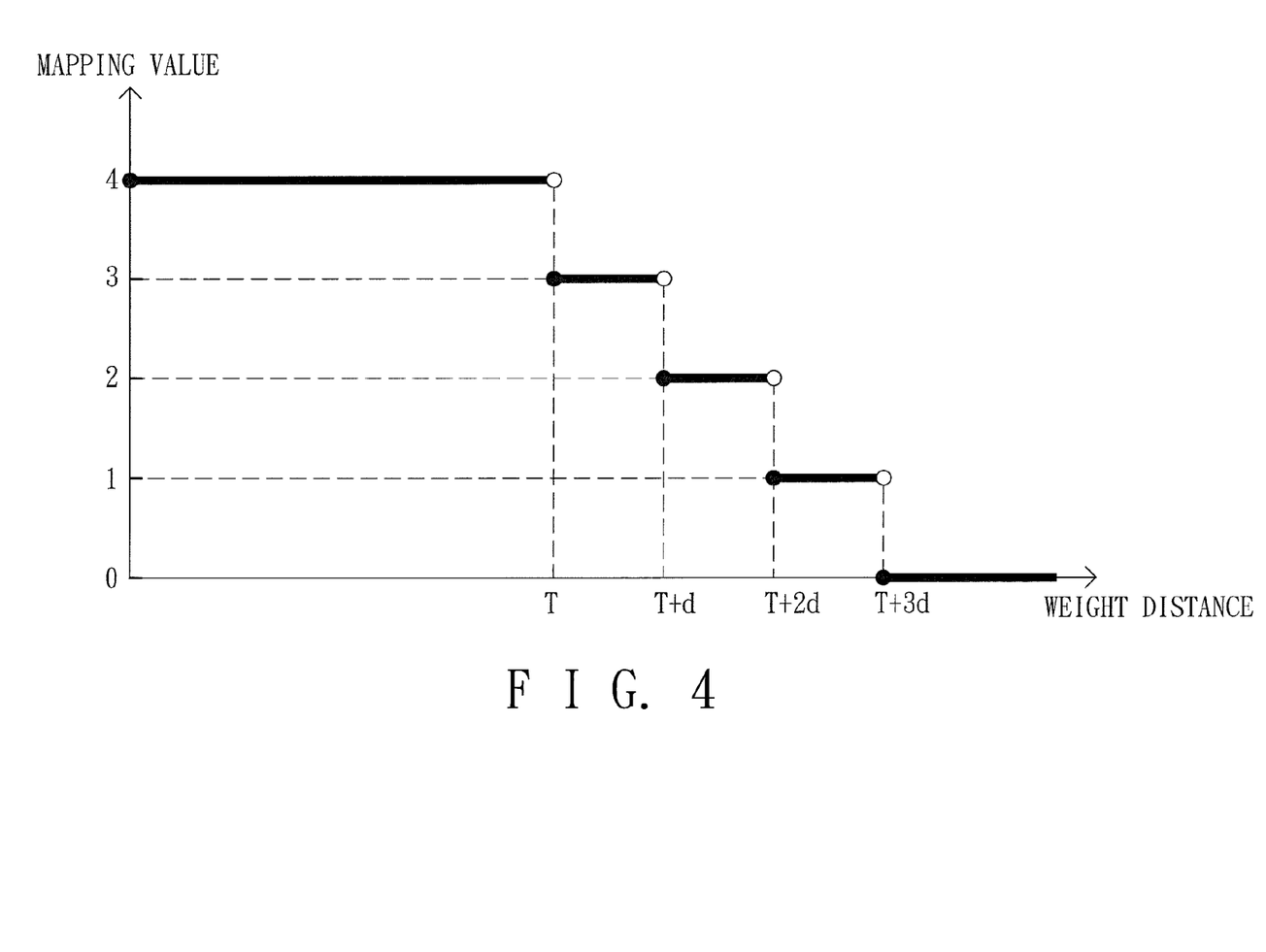
FIG. 4 is a diagram to illustrate an inverse relationship between mapping values and weight distances.

It is to be noted that the look-up table records a plurality of relationships, each of which associates a possible one of weight distances with a corresponding mapping value. Referring to FIG. 4, the mapping values have an inverse relationship with the weight distances, in which "T" and "D" represent a threshold value and a step value, respectively. Specifically:

when the weight distance is smaller than "T" and not smaller than "0", the mapping value is "4";

when the weight distance is smaller than "T+d" and not smaller than "T", the mapping value is "3";

when the weight distance is smaller than "T+2d" and not smaller than "T+d", the mapping value is "2";

when the weight distance is smaller than "T+3d" and not smaller than "T+2d", the mapping value is "1"; and when the weight distance is not smaller than "T+3d", the mapping value is "0".

The relationships between the mapping values and the weight distances are not limited to such, and may be otherwise in other embodiments.

In step 75, the image blender 3 is adapted to receive the first image data and the second image data, and is configured to generate the adjusted image data by blending the first image data and the second image data with reference to the adaptive weight value obtained by the weight-value generator 2. Specifically, the image blender 3 is configured to perform blending of the first and second image data based upon the mathematical equation of:

$$P_{adj} = \frac{1}{N}\{[P_1 \times W] + [P_2 \times (N-W)]\}$$

wherein "$P_{adj}$" represents an adjusted pixel of the adjusted image data corresponding to the first pixel, "$P_1$" represents the first pixel of the first image data, "$P_2$" represents a second pixel of the second image data corresponding to the first pixel, "N" is preferably any power of two for minimization of hardware circuit, and "W" is preferably an integer ranging from "0" to "N" for ensuring that the first and second pixels have positive contributions to the adjusted pixel.

It can be understood from the above steps: that the weight-value generator 2 is configured to generate the adaptive weight value according to the difference between the first pixel and the first specified pixel, and the image blender 3 is configured to perform blending of the first and second image data based upon the adaptive weight value; that the mapping values have an inverse, gradual relationship with the weight distances such that a plurality of pixels in a region that exhibit color continuity will still exhibit color continuity after the blending process; and that the adjusted image data will be similar to the first image data relative to the second image data when the adaptive weight has a larger value, and will be similar to the second image data relative to the first image data when otherwise.

In an example, the first image data corresponds to a first image, and the second image data corresponds to a second image. If the second image data is generated by subjecting the first image data to a noise reduction process, the second image will be blurry relative to the first image. If the first specified pixel corresponds to a green color, pixels of the first image data that correspond respectively to green colors will have substantial contributions to corresponding pixels of the adjusted image data relative to those that correspond to other colors. Such a configuration may be useful for enhancing regions of the first image that encompass grass.

In another example, if the second image data is generated by subjecting the first image data to a noise reduction process, the first specified pixel corresponds to a skin color, and the mapping values have a positive relationship with the weight distances, pixels of the first image data that correspond to skin colors will have less substantial contributions to corresponding pixels of the adjusted image data. Such a configuration may be useful for providing a skin softening effect.

In a modification of the first preferred embodiment, the image blender 3 is configured to perform blending of the first and second image data based upon the mathematical equation of $$P_{adj} = \frac{1}{N}\{[P_1 \times (N-W)] + [P_2 \times W]\}$$

It is to be noted that the image adjustment device 100 may be configured to perform adjustment upon pixels in different regions of the first image data based upon different specified pixels, multipliers (MUL), and look-up tables.

Furthermore, the image adjustment device 100 of the first preferred embodiment further includes a color-space converter 4 configured to convert the pixel components of the first pixel to components of an output color space. For example, in an application in which the first pixel has pixel components in a color space of RGB and the first specified pixel has components in a color space of YCbCr, the color-space converter 4 may be configured to convert the pixel components of the first pixel from RGB to YCbCr. However, in the present embodiment, since the pixel components of the first pixel and components of the first specified pixel are in the same color space as the output color space, the color-space converter 4 may be omitted.

In addition, the image adjustment device 100 may be configured to perform adjustment upon images received from sources other than the storage device 200.

Figure 5:
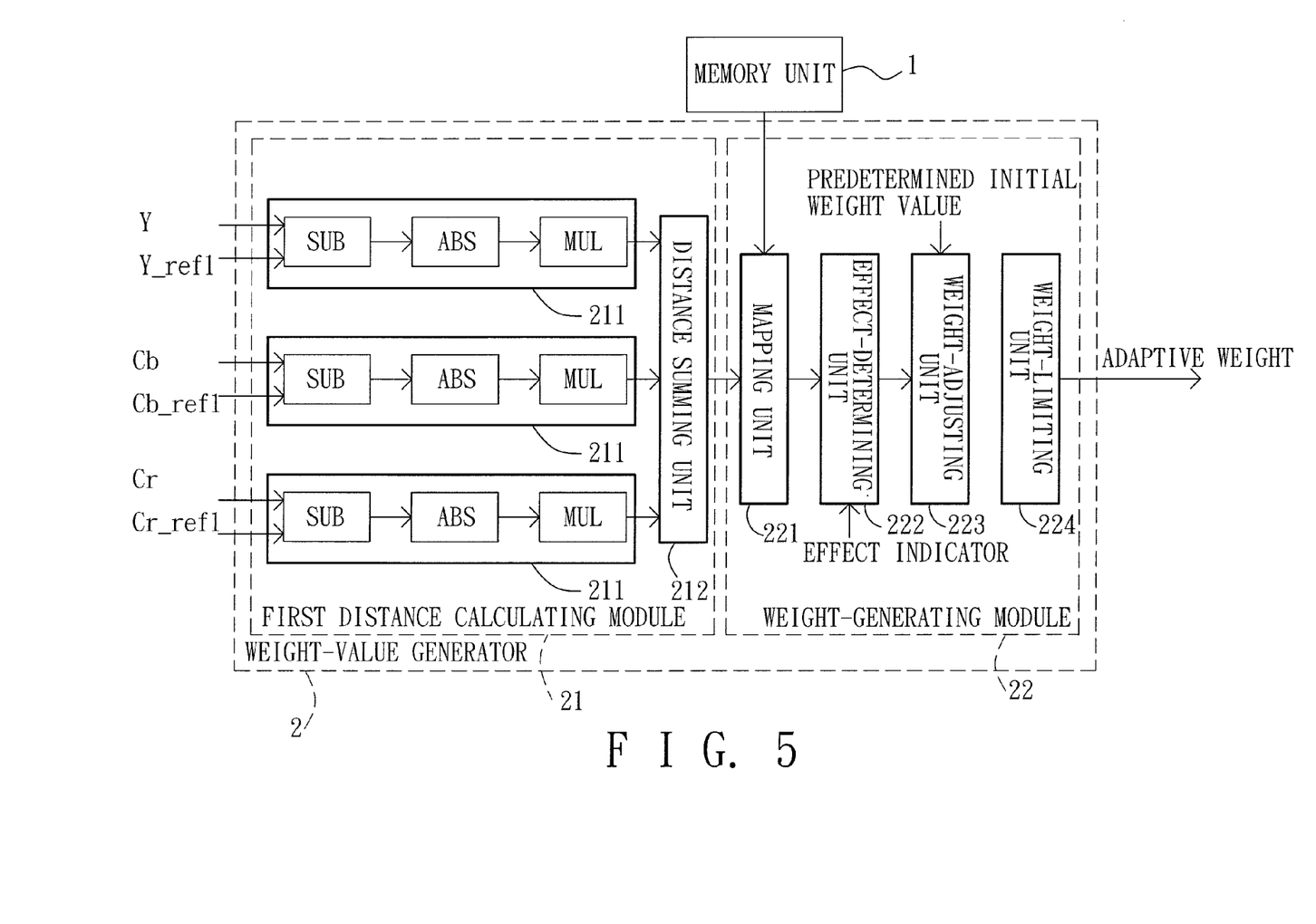
FIG. 5 is a schematic block diagram of a weight-value generator of the second preferred embodiment of an image adjustment device according to the present invention.
Figure 6:
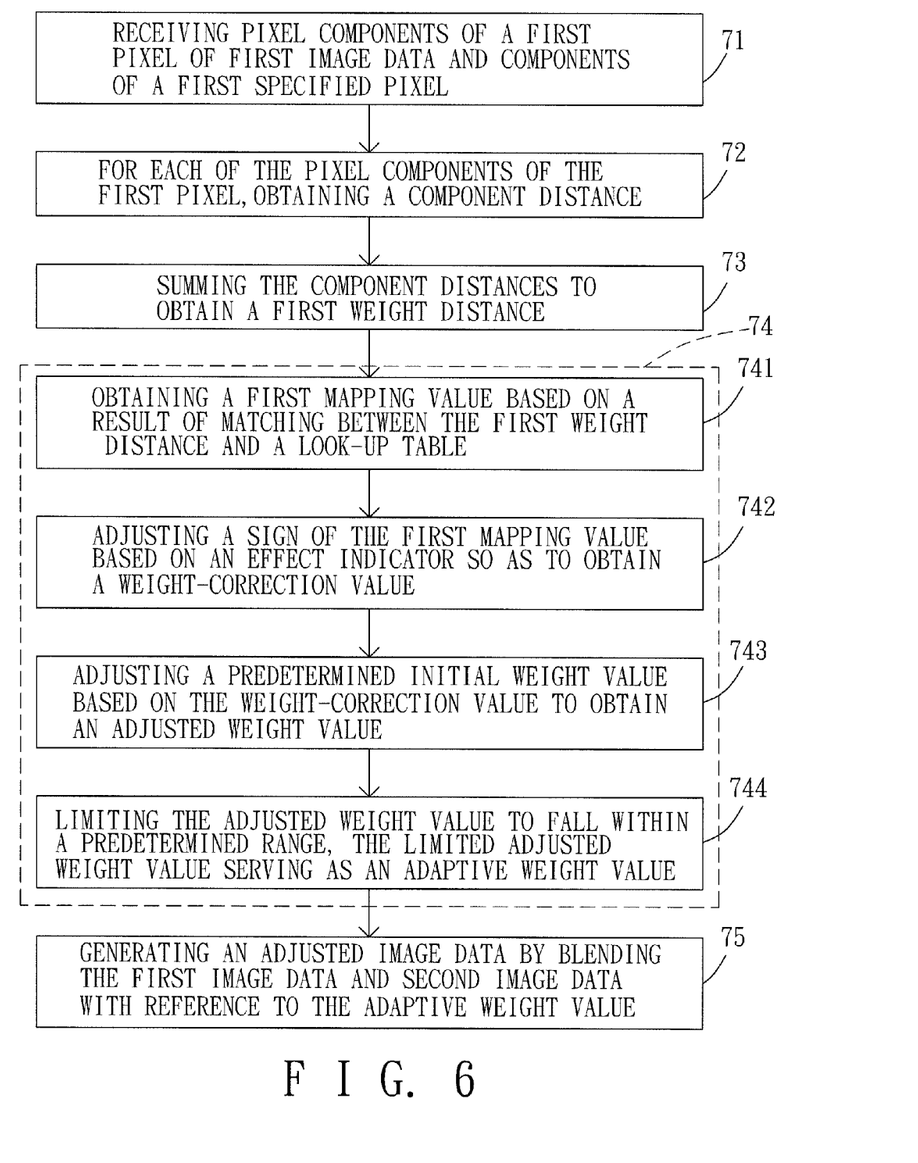
FIG. 6 is a flowchart to illustrate the second preferred embodiment of an image adjustment method according to the present invention.

Referring to FIG. 5, the difference between the first and second preferred embodiments of this invention resides in that the weight-generating module 22, in addition to the mapping unit 221, further includes an effect-determining unit 222, a weight-adjusting unit 223, and a weight-limiting unit 224. Referring to FIG. 6, the image adjustment device 100 of the second preferred embodiment is configured to perform the second preferred embodiment of an image adjustment method according to the present invention. In comparison with the first preferred embodiment, step 74 of the image adjustment method of the second preferred embodiment includes sub-steps 741 to 744.

In sub-step 741, the mapping unit 221 is configured to obtain the first mapping value based on a result of matching between the first weight distance and the look-up table.

In sub-step 742, the effect-determining unit 222 is configured to adjust a sign of the first mapping value based on an effect indicator so as to obtain a weight-correction value.

In sub-step 743, the weight-adjusting unit 223 is configured to adjust a predetermined initial weight value based on the weight-correction value to obtain an adjusted weight value.

In sub-step 744, the weight-limiting unit 224 is configured to limit the adjusted weight value to fall within a predetermined range. The adjusted weight value limited by the weight-limiting unit 224 serves as the adaptive weight value.

A skin-softening effect may be achieved by subjecting the first image data to a noise reduction process, and configuring the image adjustment device 100 such that the first specified pixel corresponds to a skin color and the weight-correction value is a negative value, thereby increasing contribution of the second image data to the adjusted image data. On the other hand, an edge-emphasizing effect specific to green grass may be achieved by subjecting the first image data to a noise reduction process, and configuring the image adjustment device 100 such that the first specified pixel corresponds to a green color and the weight-correction value is a positive value, thereby increasing contribution of the first image data to the adjusted image data.

Figure 7:
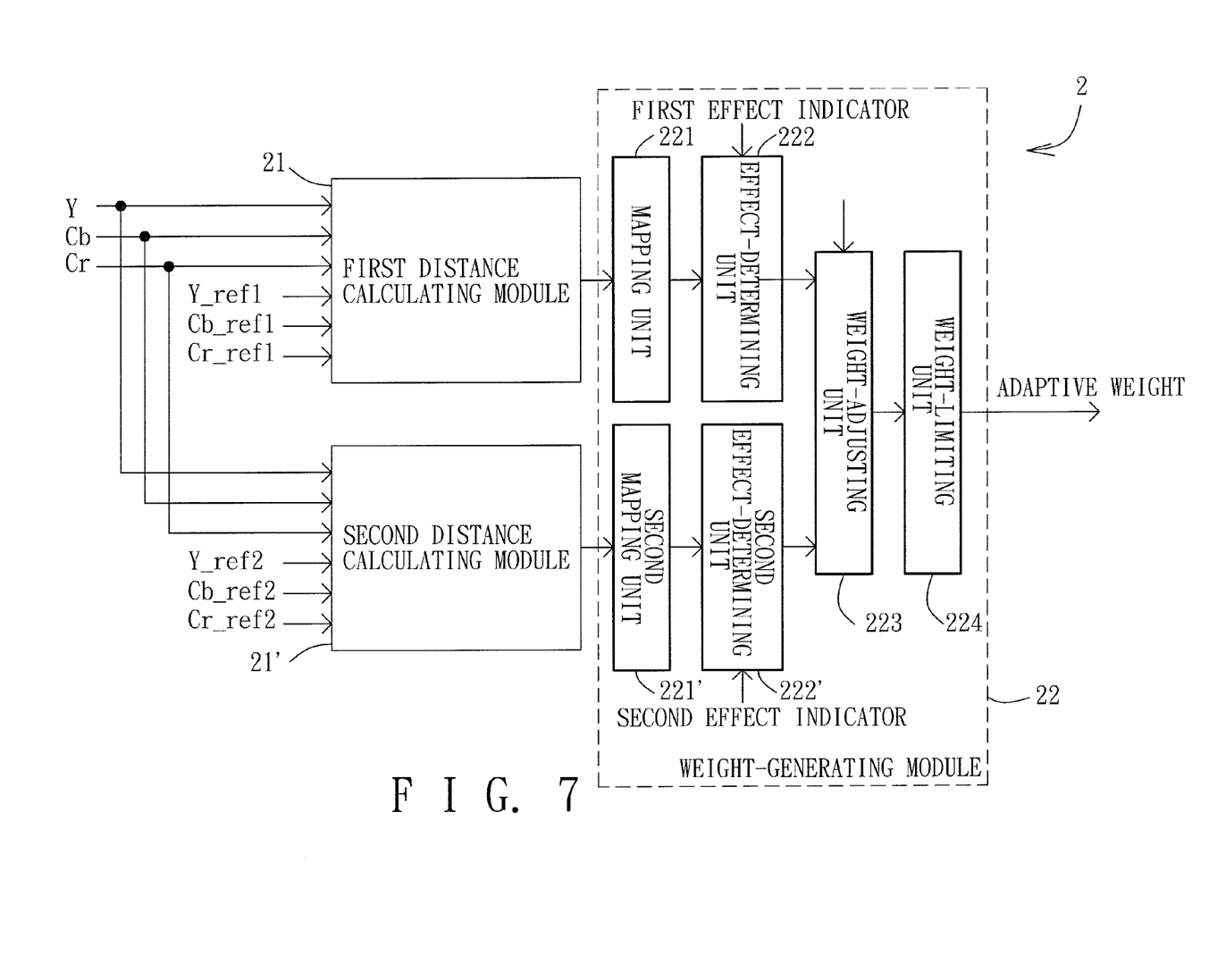
FIG. 7 is a schematic block diagram of a weight-value generator of the third preferred embodiment of an image adjustment device according to the present invention.

Referring to FIG. 7, the difference between the second and third preferred embodiments of this invention resides in that, in the third preferred embodiment, the specified data further includes a second specified pixel, the weight-value generator 2 further includes a second distance calculating module 21', and the weight-generating module 22 further includes a second mapping unit 221' and a second effect-determining unit 222'.

The second distance calculating module 21' is identical to the first distance calculating module 21 in terms of structure and function, and is configured to obtain a second weight distance based on a difference between the first pixel and the second specified pixel. The second mapping unit 221' is configured for obtaining a second mapping value based on a result of matching between the second weight distance and the look-up table. The second effect-determining unit 222' is configured to adjust a sign of the second mapping value based on a second effect indicator so as to obtain a second weight-correction value. The weight-adjusting unit 223 is configured to sum the first and second weight-correction values and the predetermined initial weight value to obtain the adjusted weight value. Subsequently, the weight-limiting unit 224 is configured to limit the adjusted weight value to fall within the predetermined range. The adjusted weight value limited by the weight-limiting unit 224 serves as the adaptive weight value.

In the third preferred embodiment, if the first and second specified pixels are substantially different and one of the first and second weight distances is sufficiently small, depending on configuration, one of the first and second weight-correction values may have a more substantial contribution to the corresponding pixel of the adjusted image data relative to the other of the first and second weight-correction values. However, configuration of the image adjustment device of the third preferred embodiment is not limited to such. In other embodiments, the specified data may include any number of specified pixels, the weight-value generator 2 may include a corresponding number of distance calculating modules 21, and the weight-generating module 22 may include a corresponding number of mapping units 221 and a corresponding number of effect-determining units 222.

In summary, the image adjustment device 100 of each of the preferred embodiments is configured to independently perform image adjustment upon each pixel of the first image data based on a difference between the pixel and at least one specified pixel, thereby maintaining color continuity and enhancing details of the first image data.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. An image adjustment method comprising the steps of:
 a) configuring a weight-value generator to receive first image data and specified data and to generate an adaptive weight value according to the first image data and the specified data; and
 b) configuring an image blender to receive the first image data and second image data which is generated by subjecting the first image data to a predetermined image-processing process, and to generate adjusted image data by blending the first image data and the second image data with reference to the adaptive weight value;
 wherein the adaptive weight value has a magnitude that corresponds to a difference between the first image data and the specified data.

2. The image adjustment method as claimed in claim 1, wherein the first image data includes a first pixel, and the specified data includes a first specified pixel, the magnitude of the adaptive weight value corresponding to a difference between the first pixel and the first specified pixel.

3. The image adjustment method as claimed in claim 2, wherein the first pixel includes a plurality of pixel components, and the first specified pixel includes a plurality of components that correspond to the pixel components of the first pixel, respectively.

4. An image adjustment method, comprising the steps of:
a) configuring a weight-value generator to receive first image data and specified data and to generate an adaptive weight value according to the first image data and the specified data; and
b) configuring an image blender to receive the first image data and second image data, and to generate adjusted image data by blending the first image data and the second image data with reference to the adaptive weight value;
wherein the adaptive weight value has a magnitude that corresponds to a difference between the first image data and the specified data,
wherein the first image data includes a first pixel, and the specified data includes a first specified pixel, the magnitude of the adaptive weight value corresponding to a difference between the first pixel and the first specified pixel,
wherein the first pixel includes a plurality of pixel components, and the first specified pixel includes a plurality of components that correspond to the pixel components of the first pixel, respectively, and
wherein step a) includes the sub-steps of:
a1) obtaining a first component distance corresponding to a difference between one of the pixel components of the first pixel and the corresponding component of the first specified pixel;
a2) obtaining a second component distance corresponding to a difference between another one of the pixel components of the first pixel and the corresponding component of the first specified pixel;
a3) summing the first and second component distances obtained for the first pixel so as to obtain a first weight distance; and
a4) c obtaining a first mapping value based on a result of matching between the first weight distance and a look-up table, and to generate the adaptive weight value based on the first mapping value.

5. The image adjustment method as claimed in claim 4, wherein the first mapping value serves as the adaptive weight value.

6. The image adjustment method as claimed in claim 4, wherein sub-step a4) includes adjusting a sign of the first mapping value based on an effect indicator so as to obtain a weight-correction value, to adjust a predetermined initial weight value based on the weight-correction value to obtain an adjusted weight value, and to limit the adjusted weight value to fall within a predetermined range, the adjusted weight value limited as such serving as the adaptive weight value.

7. The image adjustment method as claimed in claim 4, wherein the look-up table records a plurality of relations, each of which associates a possible one of weight distances with a corresponding mapping value, the mapping values having an inverse relationship with the weight distances.

8. The image adjustment method as claimed in claim 4, wherein the specified data further includes a second specified pixel,
the step a) further including obtaining a second weight distance based on a difference between the first pixel and the second specified pixel, the adaptive weight value being generated based on the first and second weight distances.

9. The image adjustment method as claimed in claim 8, wherein sub-step a4) includes obtaining a second mapping value based on a result of matching between the second weight distance and the look-up table, to adjust a sign of the first mapping value based on a first effect indicator so as to obtain a first weight-correction value, to adjust a sign of the second mapping value based on a second effect indicator so as to obtain a second weight-correction value, to sum the first and second weight-correction values and a predetermined initial weight value to obtain an adjusted weight value, and to limit the adjusted weight value to fall within a predetermined range, the adjusted weight value limited as such serving as the adaptive weight value.

10. The image adjustment method as claimed in claim 4, wherein the pixel components of the first pixel are pixel components of an input color space,
the image adjustment method further comprising, prior to step a), the step of configuring a color-space converter to convert the pixel components of the first pixel to pixel components of an output color space,
wherein the components of the first specified pixel are pixel components of the output color space.

11. An image adjustment device comprising:
a weight-value generator configured to receive first image data and specified data and configured to generate an adaptive weight value according to the first image data and the specified data; and
an image blender configured to receive the first image data and second image data which is generated by subjecting the first image data to a predetermined image-processing process, and configured to generate adjusted image data by blending the first image data and the second image data with reference to the adaptive weight value;
wherein the adaptive weight value has a magnitude that corresponds to a difference between the first image data and the specified data.

12. The image adjustment device as claimed in claim 11, wherein the first image data includes a first pixel, and the specified data includes a first specified pixel, the magnitude of the adaptive weight value corresponding to a difference between the first pixel and the first specified pixel.

13. The image adjustment device as claimed in claim 12, wherein the first pixel includes a plurality of pixel components, and the first specified pixel includes a plurality of components that correspond to the pixel components of the first pixel, respectively.

14. An image adjustment device comprising:
a weight-value generator configured to receive first image data and specified data and configured to generate an adaptive weight value according to the first image data and the specified data;
an image blender configured to receive the first image data and second image data, and configured to generate adjusted image data by blending the first image data and the second image data with reference to the adaptive weight value; and
a memory unit that has a look-up table stored therein,
wherein the adaptive weight value has a magnitude that corresponds to a difference between the first image data and the specified data,
wherein the first image data includes a first pixel, and the specified data includes a first specified pixel, the magnitude of the adaptive weight value corresponding to a difference between the first pixel and the first specified pixel,
wherein the first pixel includes a plurality of pixel components, and the first specified pixel includes a plurality of components that correspond to the pixel components of the first pixel, respectively, and wherein the weight-value generator includes:

a first distance calculating module including
- a first distance calculating unit configured to obtain a first component distance corresponding to a difference between one of the pixel components of the first pixel and the corresponding component of the first specified pixel,
- a second distance calculating unit configured to obtain a second component distance corresponding to a difference between another one of the pixel components of the first pixel and the corresponding component of the first specified pixel, and
- a distance summing unit configured to sum the first and second component distances obtained for the first pixel so as to obtain a first weight distance; and a weight-generating module configured to obtain a first mapping value based on a result of matching between the first weight distance and the look-up table in the memory unit, and to generate the adaptive weight value based on the first mapping value.

15. The image adjustment device as claimed in claim 14, wherein the first mapping value serves as the adaptive weight value.

16. The image adjustment device as claimed in claim 14, wherein the weight-generating module includes:
- a mapping unit for obtaining the first mapping value based on the result of matching between the first weight distance and the look-up table;
- an effect-determining unit configured to adjust a sign of the first mapping value based on an effect indicator so as to obtain a weight-correction value;
- a weight-adjusting unit configured to adjust a predetermined initial weight value based on the weight-correction value to obtain an adjusted weight value; and
- a weight-limiting unit configured to limit the adjusted weight value to fall within a predetermined range, the adjusted weight value limited by the weight-limiting unit serving as the adaptive weight value.

17. The image adjustment device as claimed in claim 14, wherein the look-up table records a plurality of relations, each of which associates a possible one of weight distances with a corresponding mapping value, the mapping values having an inverse relationship with the weight distances.

18. The image adjustment device as claimed in claim 14, wherein the specified data further includes a second specified pixel, the weight-value generator further including a second distance calculating module configured to obtain a second weight distance based on a difference between the first pixel and the second specified pixel, the weight-generating module generating the adaptive weight value based on the first and second weight distances.

19. The image adjustment device as claimed in claim 18, wherein the weight-generating module includes:
- a first mapping unit for obtaining the first mapping value based on the result of matching between the first weight distance and the look-up table;
- a second mapping unit for obtaining a second mapping value based on a result of matching between the second weight distance and the look-up table;
- a first effect-determining unit configured to adjust a sign of the first mapping value based on a first effect indicator so as to obtain a first weight-correction value;
- a second effect-determining unit configured to adjust a sign of the second mapping value based on a second effect indicator so as to obtain a second weight-correction value;
- a weight-adjusting unit configured to sum the first and second weight-correction values and a predetermined initial weight value to obtain an adjusted weight value; and
- a weight-limiting unit configured to limit the adjusted weight value to fall within a predetermined range, the adjusted weight value limited by the weight-limiting unit serving as the adaptive weight value.

20. The image adjustment device as claimed in claim 14, wherein the pixel components of the first pixel are pixel components of an input color space, the image adjustment device further comprising a color-space converter configured to convert the pixel components of the first pixel to pixel components of an output color space, wherein the components of the first specified pixel are pixel components of the output color space.

* * * * *